United States Patent Office 3,461,766
Patented Aug. 19, 1969

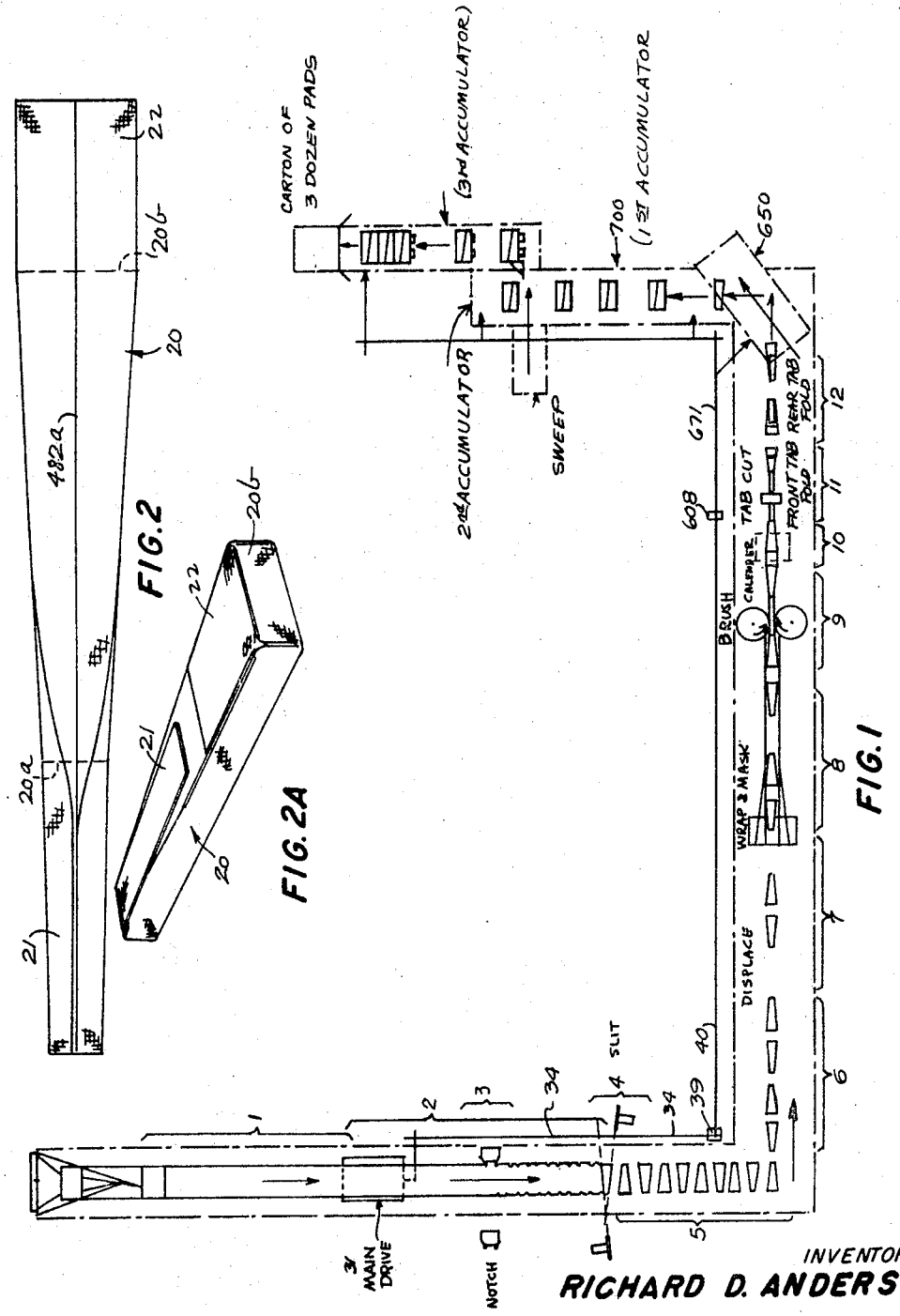

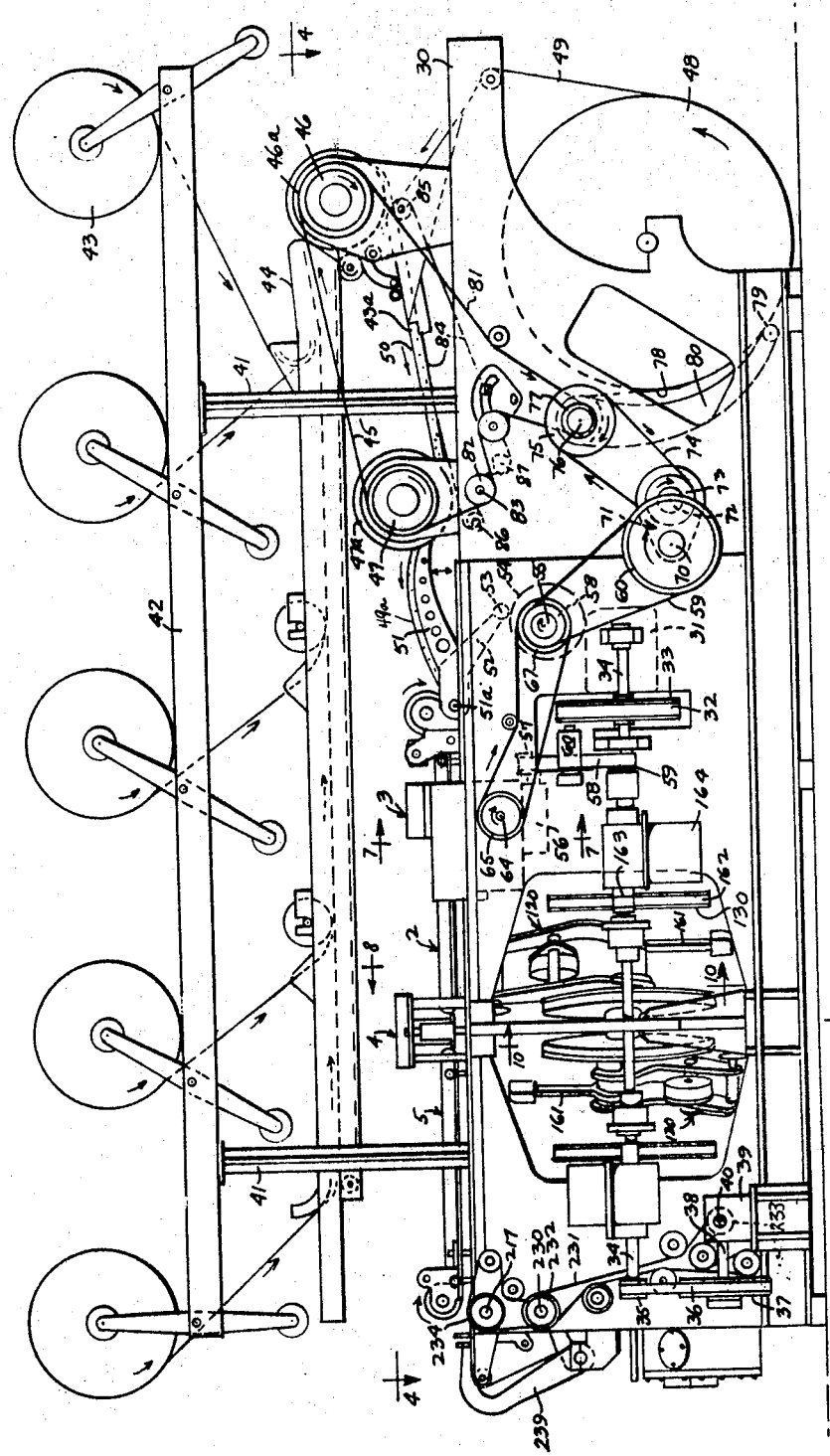

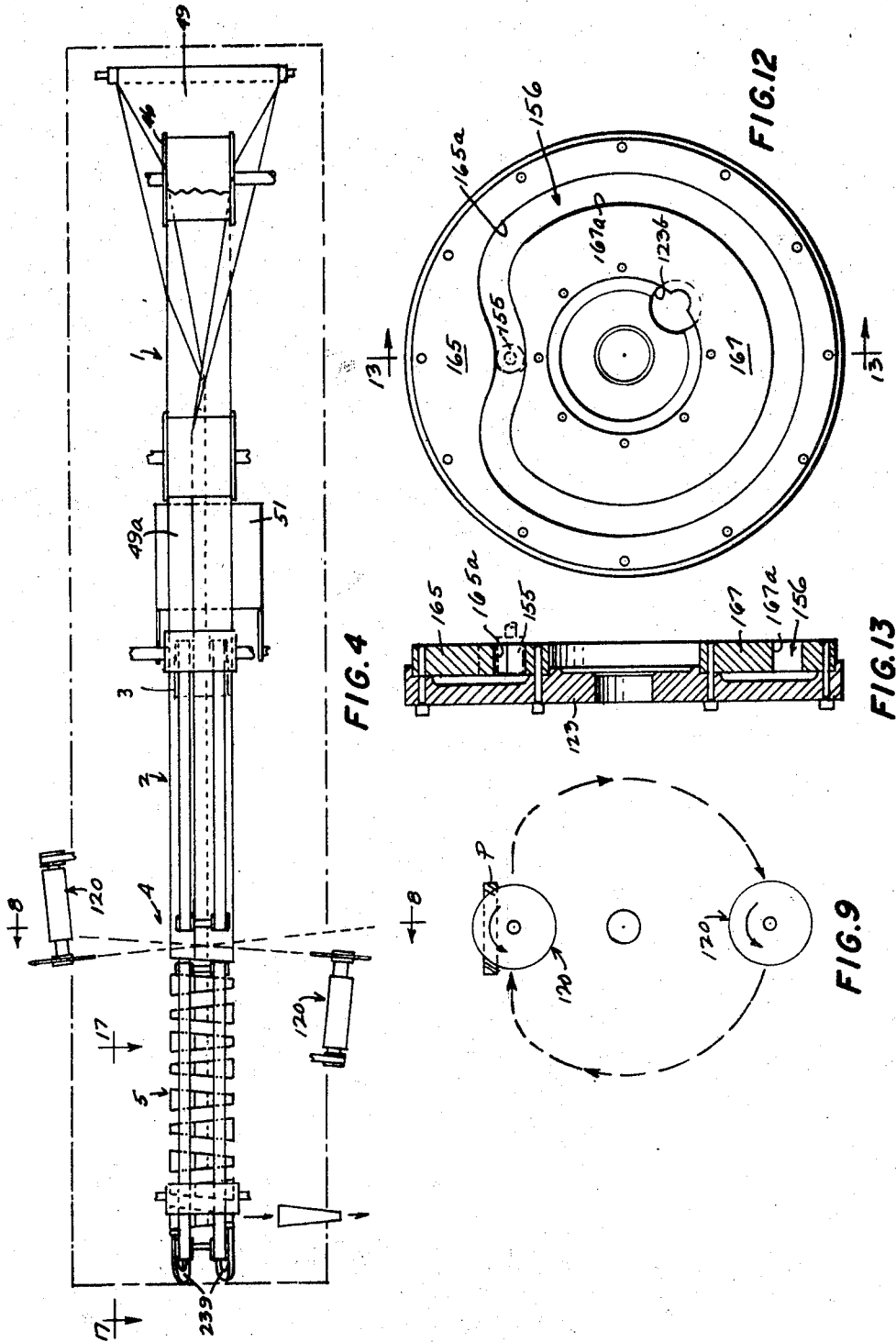

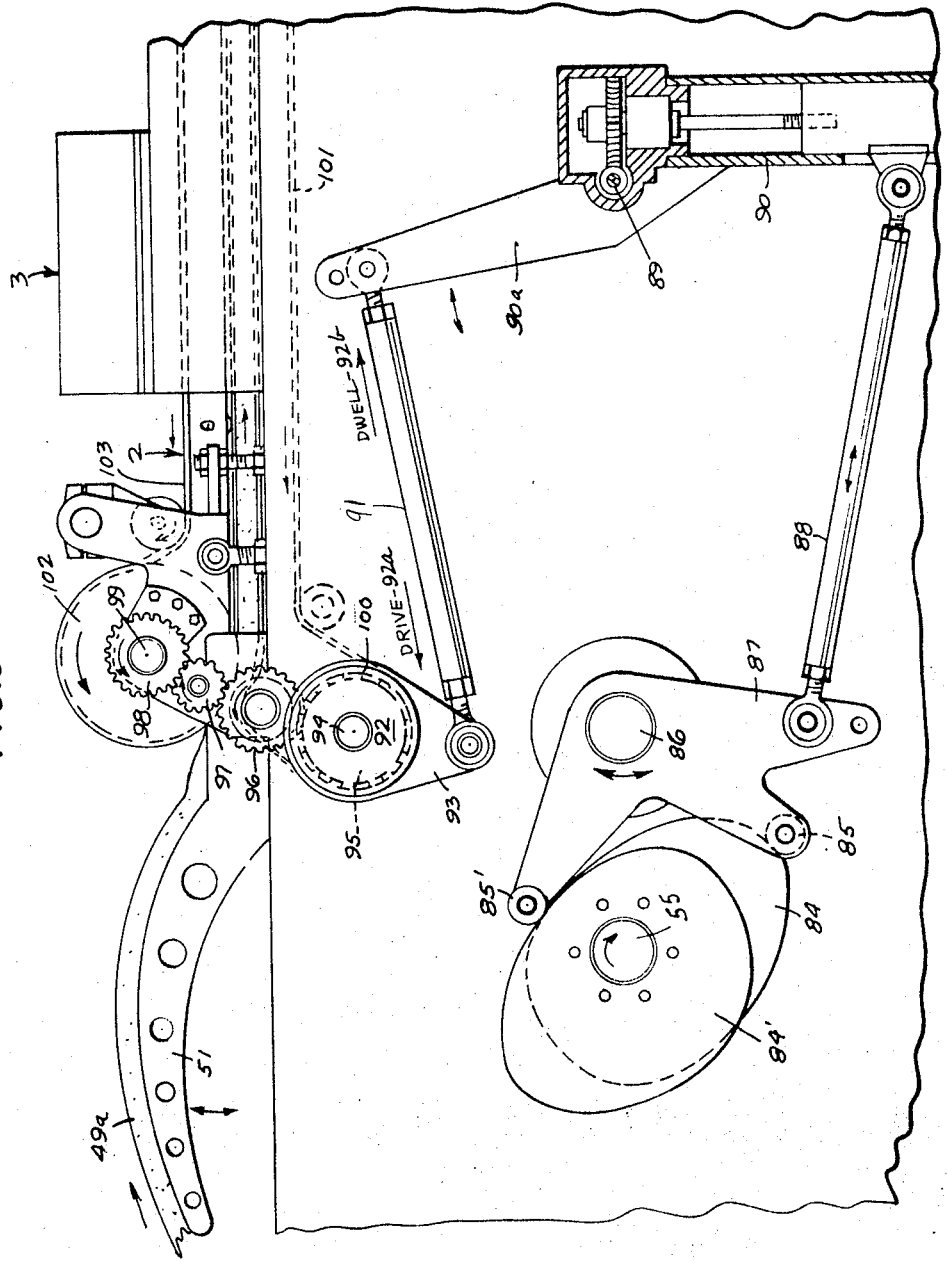

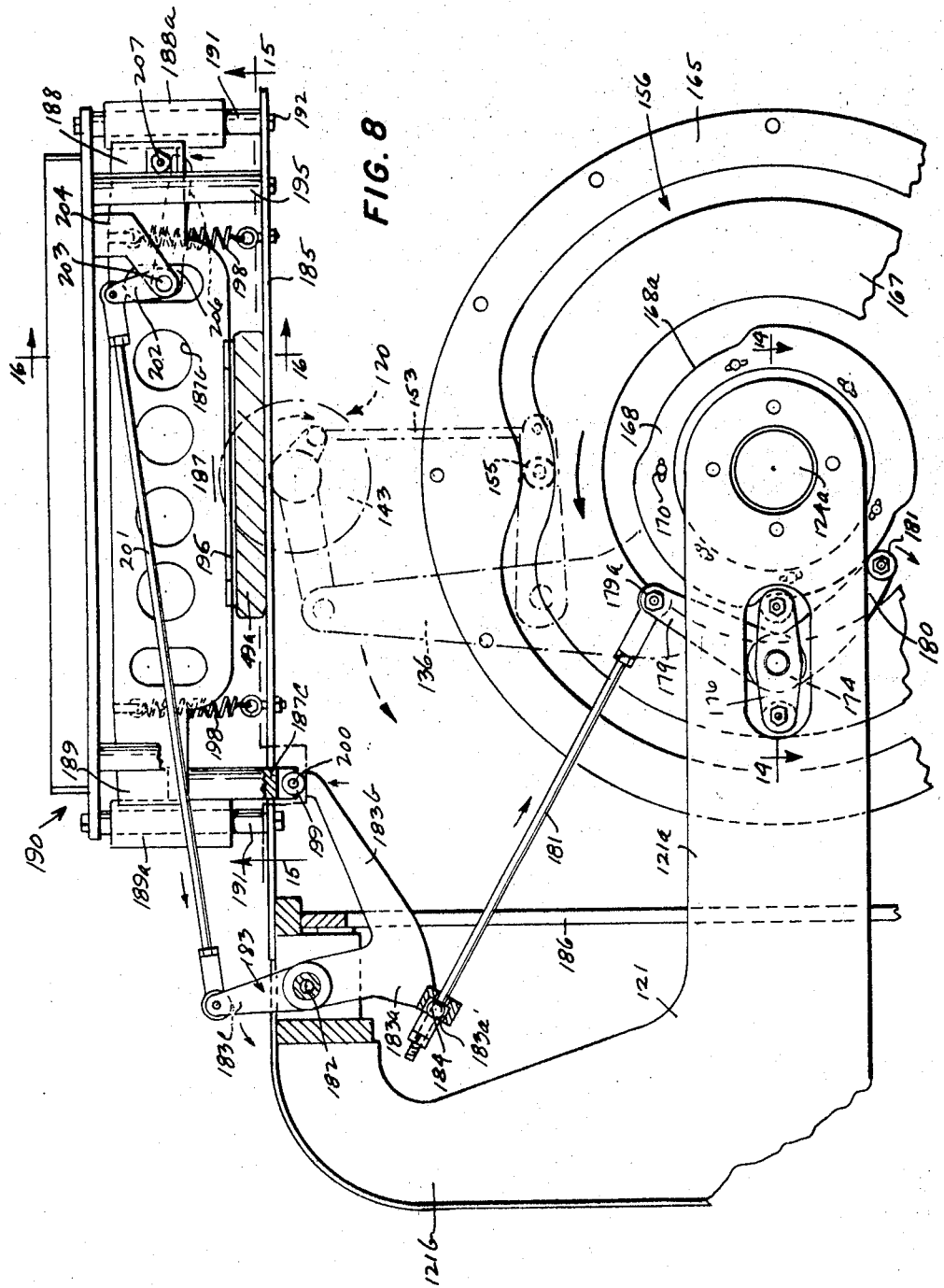

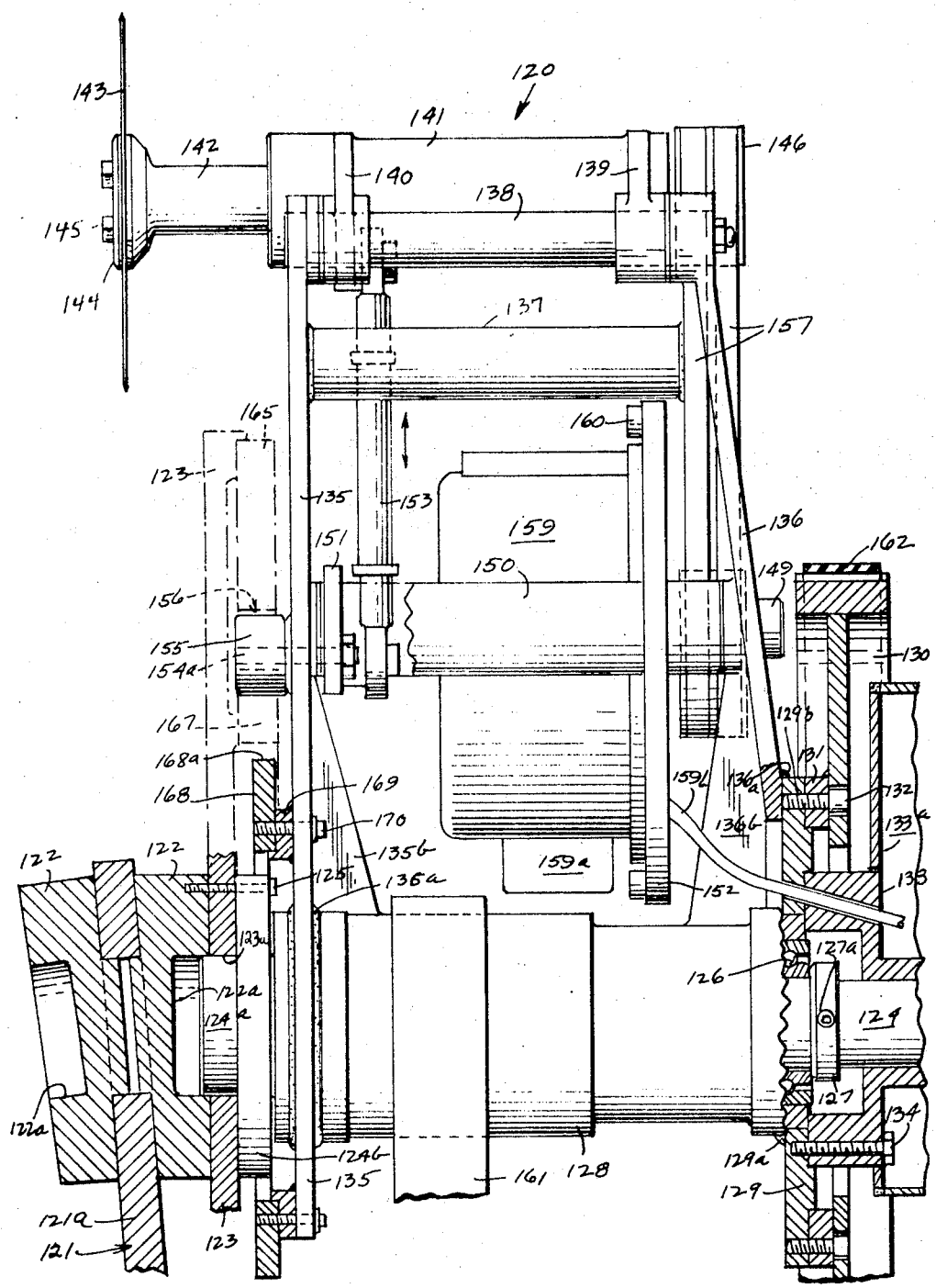

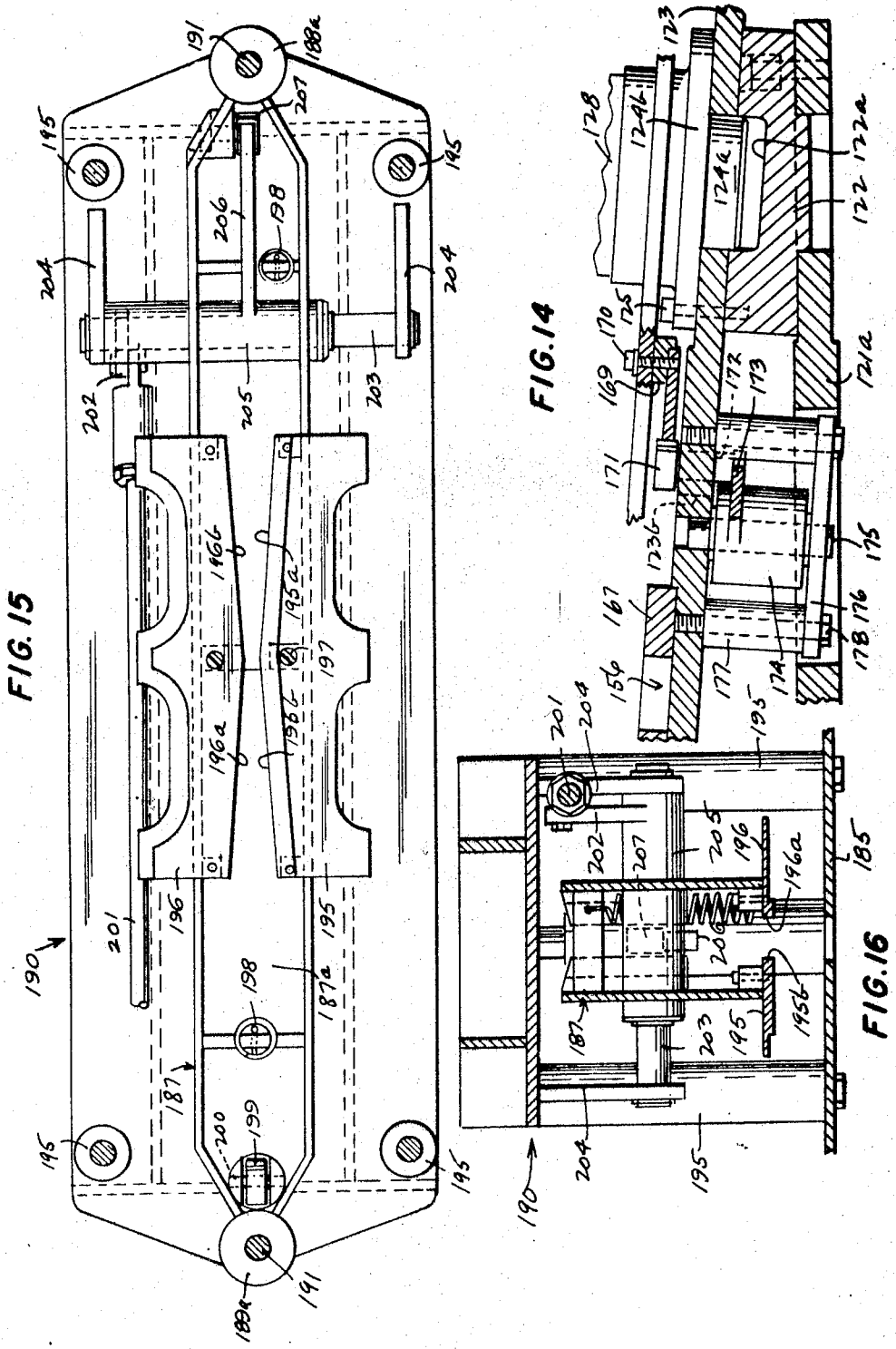

3,461,766
SLITTING APPARATUS FOR CUTTING CELLULOSIC PADS FROM WADDING WEB
Richard D. Anderson, Neenah, Wis., assignor to Kimberly-Clark Corporation, Neenah, Wis., a corporation of Delaware
Original application Apr. 27, 1964, Ser. No. 362,893, now Patent No. 3,344,483, dated Oct. 3, 1967. Divided and this application Dec. 9, 1966, Ser. No. 619,093
Int. Cl. B26d 5/20, 7/06
U.S. Cl. 83—255                        7 Claims

ABSTRACT OF THE DISCLOSURE

This apparatus is directed to feeding on a bed path having a slot therein wrapped wadding intermittently to a clamping mechanism, a mechanism adjacent the clamping mechanism for successively cutting the wadding web at equal arcuate but oppositely disposed angles to the line of feed whereby there is cut isosceles trapezohedron pads having a wide and and opposite narrow end an nonparallel sides. The cutting mechanism includes two rotating arms each at an angle to the line of feed of the web. Each of the cutting mechanisms has a rotating arm that mounts an arm system carrying a pivotally mounted rotating cutting disc. A motor means carried by the counter-balanced arm system for each rotary disc drives each cutting disc through drive means. The arm system is under the control of a cam so that the rotating cutting disc makes a cut through the web while traveling generally parallel to the bed and through the transverse slot in the bed. There is also notching mechanism to round off the corners of the pads.

---

This is a division of application Ser. No. 362,893, filed Apr. 27, 1964, now Patent No. 3,344,483, issued Oct. 3, 1967.

This invention is directed to improved apparatus for continuously making tapered sanitary pads from wadding.

In the making and wrapping of tapered pads having an approximate isosceles trapezohedron shape there is the problem of first cutting the tapered pads to shape and, then spacing them on a wrapping web with wide end to wide end and short end to short end and applying and folding of the wrap smoothly about the pads and the forming and folding of end tabs from the connecting wrap between the pads.

It is an object of my present invention to provide a slitting mechanism for cutting the tapered pads from wadding web.

For a more complete understanding of the invention reference is had in the drawing and claims in which;

FIG. 1 is a diagrammatic plan view of a sanitary pad making machine and angle transfer of a completed pads and outline of accumulator;

FIG. 2 is a view of the pad with tabs extending to each end;

FIG. 2A is a perspective view of a tapered sanitary pad;

FIG. 3 is a side elevation of wadding assembly and taper cutter apparatus;

FIG. 4 is a diagrammatic plan view along line 4—4 of FIG. 3;

FIG. 5 is a side elevation of intermittent wadding feed to cutter;

FIG. 8 is a vertical sectional view along line 8—8 of FIG. 3, looking in the direction of wadding flow showing wadding clamp and one slitter on an enlarged scale with back plate removed for clarity;

FIG. 9 is a vertical diagrammatic view of the two slitters, their direction of rotation and orbital path along line 9—9 of FIG. 4;

FIG. 11 is a plan view of the rear slitter in a horizontal attitude of its orbit and a fragmentary cross sectional view of angular relationship of the main shafts about which each slitter orbits;

FIG. 12 is a vertical view of a cam track controlling the radial path of the slitter so that it has an approximate horizontal path through the wadding;

FIG. 13 is a vertical section of the cam and support plate along line 13—13 of FIG. 12.

FIG. 14 is a sectional view on an enlarged scale of the main support arm, the back plate, the main shaft and cam track of slitter assembly along line 14—14 of FIG. 8;

FIG. 15 is a bottom plan view of the wadding clamp along line 15—15 of FIG. 8 on an enlarged scale; and FIG. 16 is a vertical sectional view of the wadding clamp along line 16—16 of FIG. 8.

Throughout the description like reference numbers refer to similar parts.

Figure 7:
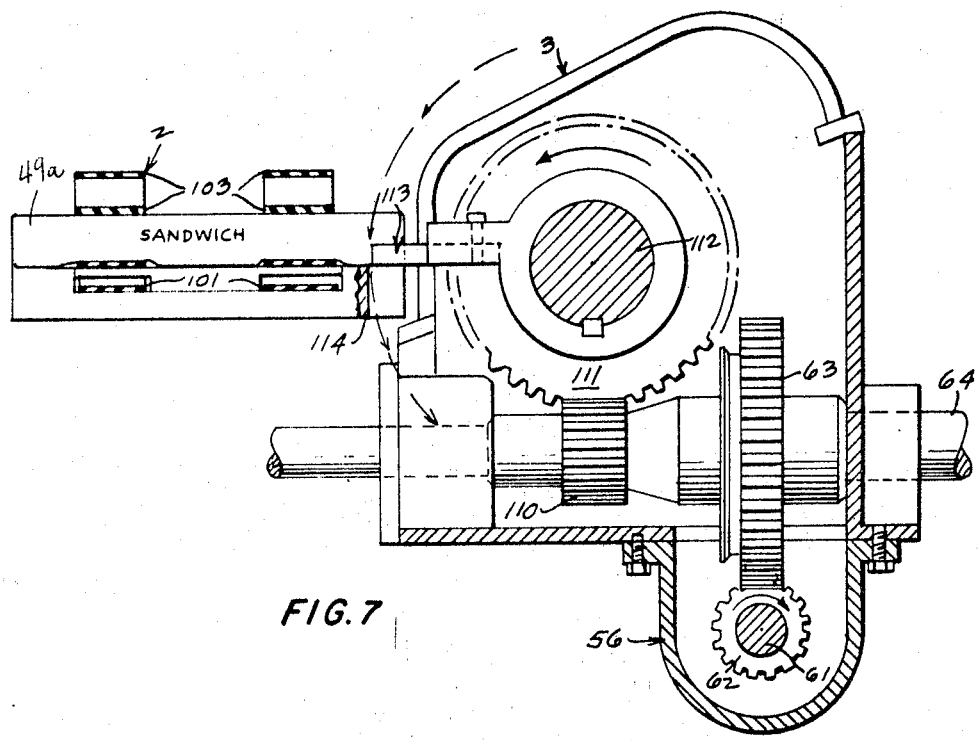
FIG. 7 is a fragmentary cross sectional view of one corner cutter along line 7—7 of FIG. 3.

FIG. 1 is a diagrammatic plan view of the sanitary pad making machine and angle transfer mechanism of completed pads, such outline of accumulator which is the subject of a separate application. The wadding is made up as a lamination at station 1 and intermittently fed through an intermittent feed conveyor at station 2 which has associated therewith a corner cutter 3 for the pads to be formed. The intermittent feed 2 feeds the wadding which has had the proper corner cuts made therein to a pair of slitters at station 4 each of which cuts at an angle to make the tapered pads. A continuous running conveyor 5 takes the pads from the slitter in equal spaced relation in a general parallel attitude to each other to the end of the continuous conveyor 5. A transverse pad feed conveyor 6 pulls off each pad individually and transfers it in equal spaced end to end relation to a displacement mechanism 7. This displacement mechanism 7 is necessary to properly space the pads with their wider ends closer together and their narrower ends further apart. The sanitary pads are worn with the narrower end to the back which has the longer tab while the wider end is at the front with the shorter tab. The displacement mechanism 7 transfers the spaced pads to a wrap and mask applying and folding mechanism 8 and after folding the wrap and mask the pads pass with wrap and mask thereon to a tab former 9, thence to a calendering station 10, to a tab cutter and front tab folding and conveying mechanism 11, thence to a rear tab folding and conveying mechanism 12 and finally to an angle transfer mechanism 13 where the completed pads are transferred to accumulators.

In FIG. 2 a perspective general outline showing of a completed pad 20 is shown with a narrower end 20a and a wider end 20b, the narrower end 20a has the longer tab 21 while the wider end 20b has the shorter tab 22. As indicated above the narrower end 20a is worn to the rear with the longer tab 21 while the wider end 20b is worn to the front with its shorter tab 22.

Reference to FIG. 4 shows in a little more detail than FIG. 1 the wadding feed 1, the intermittent feed mechanism 2, corner cutter 3 with the intermittent feed mechanism 2 feeding the assembled wadding which has been corner cut in proper positions to the slitter mechanism 4 where the wadding is clamped during a cut of the rotary slitters which orbit 180° apart to cut the pads. The tapered pads are taken off by the continuous running conveyor 5 and are stopped by a fence and alternate fingers 239 at the end thereof as will be explained later.

Reference to FIG. 3 shows a machine frame 30 having a main motor shown in broken lines at 31 which through a belt 32 drives a pulley 33 on main shaft 34 that is located on the left-hand side of the machine as viewed in FIG. 4 in the direction of flow. This main shaft 34 is supported by suitable bearings and provides power through belts at various stations and through reduction gearing, all to be described hereinafter. The left-hand end of the main drive shaft 34 drives through a pulley 35 a belt 36 passing over a pulley 37 on shaft 38 leading from a gear box 39 having a drive output shaft 40 which extends transversely to drive the rest of the machine shown in FIG. 1.

Extending up from the machine frame 30 are suitable vertical supports 41 which support a pair of spaced parallel longitudinal members 42 which in turn pivotally support various rolls 43 of material making up the wadding which feeds into a trough 44 all of which is conventional. From the trough 44 the laminated wadding passes over the top and then the bottom of endless conveyor belt 45 supported by pulleys 46 and 47 on appropriate shafts so that the wadding 48 is brought onto wadding wrapper 49 lead from wadding parent roll 49a. The wadding wrapper parent roll 49a is conventionally shown supported on a portion of frame 30.

An outer wrap folder at 50 folds the wrap as shown conventionally in FIG. 4 over the wadding and the assembled sandwich 49a passes over a festooner generally indicated at 51. This festooner 51 is pivotally mounted at 51a and has a rigid depending arm 52 attached with a cam follower 53 on the end which cooperates with cam 54 on a cross shaft 55 to move the festooner 51 up and down.

This festooner 51 tends to take up the slack as the wadding is continuously fed to the slitter 4 where it stops to be cut into tapered pads. The wadding which is now wrapped passes through the intermittent driven conveyor 2 and under the corner cutter 3.

DRIVE FOR CORNER CUTTERS AND WADDING FEED

The drive from the main drive shaft 34 will now be explained for the corner cutter and the wadding feed. A counter drive unit 56 has a drive pulley 57 connected by belt 58 to pulley 59 on main shaft 34. A suitable idler 60 maintains the belt 58 taut. The counter drive unit 56 drives the corner cutter, wadding and sandwich feed. Reference to FIG. 7 shows the lower portion of the counter drive unit 56 having a shaft 61 therein on a gear 62 thereon driving a gear 63 on a counter shaft 64. The shaft 64 has a pulley 65 thereon, see FIG. 3, which through a belt 66 drives a pulley 67 on counter shaft 55. This counter shaft 55 has a cam 54 mounted thereon which moves the festooner 50 up and down as its cam follower 53 follows the cam 54.

A variable pitch sheave 68 on shaft 55 drives a belt 69 connected to pulley 70a on shaft 70 of a gear box 71. An output shaft 72 of the gear box 71 drives a pulley 73 over which a belt 74 passes to a pulley 75 on a cross shaft 76. A pulley 77 on cross shaft 76 drives an endless belt 78, which passes over an idler pulley 79 on the end of a pivot arm 80, pivoted about shaft 76. This endless belt 78 drives the wadding wrap roll 48.

A drive belt 81 driven by a pulley on shaft 76 passes over pulley 46 and the pulley 47 to drive the endless conveyor belt 45 and thence down over a drive pulley 82 mounted on a cross shaft 83 which has a suitable roll behind the pulley 82 to drive an endless conveyor belt 84 passing over idler rollers 85, 86 and 87 suitably mounted. This endless conveyor belt 84 carries the wadding web 49. The wadding web 49 carried by the endless conveyor belt 84 receives the laminates on the top thereof from the various supply rolls, previously described, and carries the assembly under the wrap folder 50 to pass under the roll 47a driven by belt 81.

INTERMITTENT FEED CONVEYOR

FIG. 5 shows the intermittent feed conveyor 2 which is viewed from the opposite side of the machine from FIG. 3. This intermittent feed conveyor 2 is driven indirectly from the shaft 55 as will be explained. The conveyor 2 feeds the assembled sandwich 49a from the festooner 51 through the corner cutters 3 and onto the cutting station 4. With respect to the drive of the intermittent feed conveyor 2 the shaft 55 drives a pair of cams 84 and 84' which provides, as will be explained, intermittent movement to the intermittent conveyor belts making up the conveyor 2. The drive is through a pair of cam followers 85–85' carried on projecting portions of an arm 87 pivoted on shaft 86. A further portion of arm 87 is connected through a link 88 to the end of an adjustable arm indicated at 90 pivoted about a shaft 89 to provide pivotal movement for an integral arm portion 90a of arm 90. Arm 90 is adjustable in length. An adjustable link 91 is pivoted to the upper end of arm 90a and connects at its other end in a pivotal manner with an arm 93 of an over running clutch 92. This drive movement for the over running clutch 92 is provided as indicated by the direction of the movement of the link 91, see drive arrow 92a and the direction of the dwell (wadding cutting) arrow 92b. The over running clutch 92 is mounted on a shaft 94 on which is fixed a gear 95 driven thereby which drives intermittently gears 96 and 97 with 97 meshing with a drive gear 98 mounted on a shaft 99. On shaft 94 is mounted a suitable drive pulley 100 which drives the lower endless belt 101 and on the upper driven shaft 99 is mounted a drive pulley 102 which drives the upper endless conveyor belt 103, the belts 101 and 103 being driven as indicated by the arrows for the intermittent conveyor 2. Suitable guide pulleys are provided for the upper and lower belts 103 and 101.

CORNER CUTTER

Figure 6:
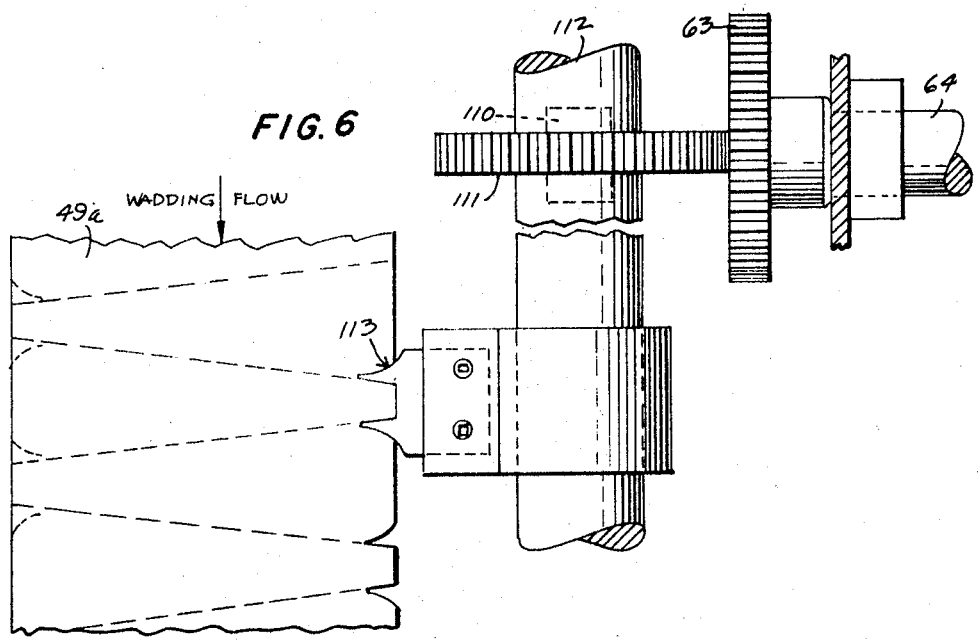
FIG. 6 is a fragmentary plan view of corner cutter.

Reference to FIGS. 6 and 7 show one of the corner cutters 3 of which there are two oppositely disposed. The drive shaft 64 driven by gear 63 carries a gear 110 which drives a gear 111 on shaft 112. This shaft 112 has mounted thereon a corner cutter 113 which is rotated by shaft 112 and cooperates with a fixed die 114 mounted in the bed of the machine. The cutters 113 and 114 are positioned to one side of the upper pairs and lower pairs of conveyor belts 103 and 101 as shown in FIG. 7. In FIG. 6 the flow of the wadding sandwich 49a is shown and in broken line the outlines of the tapered pads that will be cut at station 4. It is to be noted that the corner cutter provides for a very small or negligible corner cut at the narrower end of the pad while a more pronounced curved corner is provided at the wider end of the pad.

WADDING SLITTER AND WADDING CLAMP

Reference to FIGS. 4 and 9 show the two slitters each generally indicated at 120 as they are duplicates. In FIG. 4 the path of the respective slitters which are of a rotary type is shown as they pass through the oncoming wadding 180° apart in the orbit path shown in FIG. 9, looking in the direction of flow of the wadding 49a which has now been cut as a pad p. When one of the slitters passes through the wadding sandwich, the wadding sandwich is stopped by the intermittent feed conveyor 2, as explained above, and is clamped in place, thereafter the clamp releases, the wadding advances and the other rotating slitter or blade passes through the wadding at another angle thereby cutting off a tapered pad. As the second pass or cut is made the clamp releases and the wadding advances and pushes the cut tapered pad onto the continuous running conveyor 5. In the upper portion of FIG. 9 it will be observed that the slitter is made to travel on a generally horizontal path in its orbit as will be explained.

Figure 10:
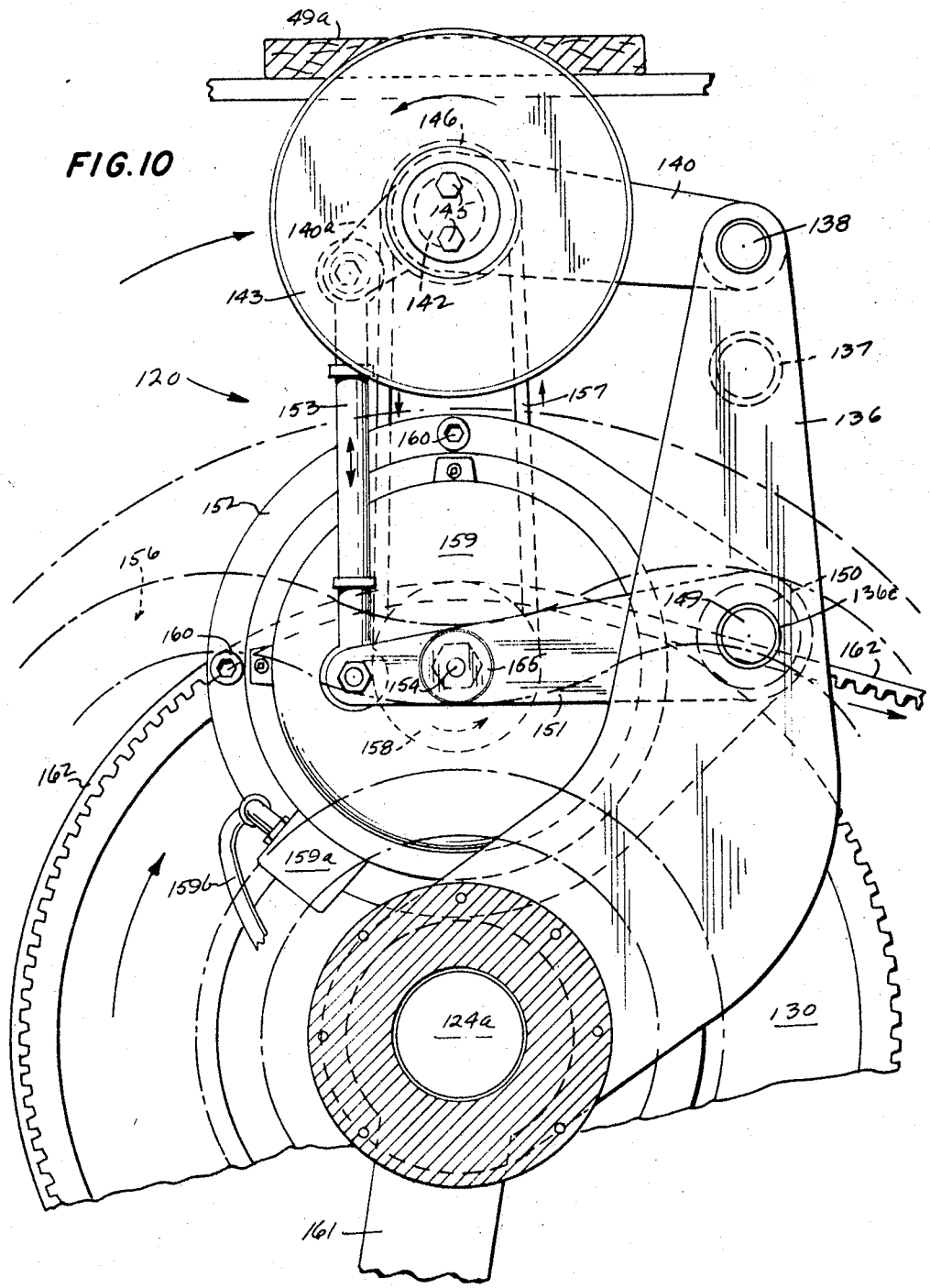
FIG. 10 is a vertical view of one of the slitters along line 10—10 of FIG. 3 with the slitter in top position cutting through the wadding.

Reference is made now to FIGS. 8, 11 and 14 in particular where is shown a main frame support 121 in the form of an arm having a horizontal portion 121a and a vertical portion 121b. A pair of wedge-like shaped mounting members 122 are attached to the inner end portion of the main arm 121a and serve to each mount a back, plate 123, the rear back plate 123 is described. A shaft assembly having an end boss 124a and adjacent flange 124b is mounted with the boss 124a extending through an aperture 123a in back mounting plate with the boss 124a extending into a receiving pocket 122a of the wedge member. The flange portion 124b is held on by suitable cap screws 125. A bearing assembly 126 indicated in the lower right-hand portion of FIG. 11 is held on by a slip collar 127 secured by a set screw 127a. A similar bearing (not shown) is mounted at the other end of the shaft 124 adjacent the flange 124b and within the tubular housing 128. The tubular housing 128 is received over the bearing assembly 126 at each end. Received about the right-hand end of the housing 128 is an annular plate 129 secured by welding 129a to the tubular member 128. A drive pulley 130 has attached to its web as by welding an annular spacer ring 131 and the web is apertured as is the ring 131 to receive securing screws 132 which are threadedly received in suitable threaded apertures 129b in annular plate 129. A collector ring assembly 133 for feeding electrical power to the motor, to be described, surrounds the right-hand end of shaft 124 in FIG. 11 and is bolted by cap screws 134 to annular plate 129 which rotates with the tubular housing 128. Still referring to FIG. 11 and FIG. 10, a right-hand arm 136 having an annular inner portion surrounds the hub 128 and is welded as at 136a to the annular plate 129. The left-hand arm 135 while of the general shape of arm 136 as shown in FIG. 10. lies all in one plane, see FIG. 11, as contrasted to arm 136 which is bent in at its upper portion. Arm 135 has an aperture so that it fits over the left-hand end of tubular member 128 and is welded thereto as at 135a. Strengthening web portions 135b and 136b are provided for these arms as shown in FIG. 11. Adjacent the outer ends of the arms 135 and 136 there is welded thereacross a cross member 137 for strengthening purposes. At the outer end of the arms 135 and 136 is a connecting cross shaft 138 which serves as a pivotal mounting for a pair of arms 139 and 140. Adjacent the outer ends of the arms 139 and 140 is a cross connecting tubular housing 141 in which is rotatably mounted a shaft 142 having on its one end the circular cutter disc 143 which is secured by a plate 144 and suitable screws 145. At the other end of shaft 142 mounted in bearings, not shown, in tubular housing 141 is a double grooved pulley 146. The opposite end from the pivotally mounted end of the arm 140 has an integral extension 140a, see FIG. 10, for the connection of control linkage which will be described. The purpose of the mounting arms 139 and 140 for the cutter disc 143 is as shown in FIG. 9 to obtain the generally flat portion of the orbital path where the cutter discs cut the wadding.

Intermediate the end of the arm 136 is a pivotal mounting 136c and, see FIG. 10, for a cross shaft 149 which pivotally receives a tubular housing 150. The same pivotal mounting is also on arm 135, but is not shown. Mounted on this tubular housing 150 adjacent the arm 135 is an integral arm 151 and opposite to the mounting of the arm 151 at the other end of the tubular housing 150 is a circular plate 152 mounted in an integral manner with the tubular housing 150. Pivotally interconnecting the outer ends of the arms 140a and 151 is a link 153 whereby these arms move together as well as the tubular members 138 and 150. Adjacent the outer end of arm 151 is pivotally attached at 154 by a suitable pivot pin 154a a cam follower 155 which rides in a cam slot generally indicated at 156, see FIG. 12.

Rotation for the cutter disc 143 is provided by a pair of belts 157 leading to a pulley 158 on a motor 159 mounted by cap screws 160 on the arm-like extending plate 152. A counter weight arm generally indicated at 161 is fixedly attached to the tubular housing 128 and is oppositely disposed for balance purposes to the center of gravity of the rotating cutter assembly 120. These counter weights in the slitters show up better in FIG. 3. Rotation for the pulley 130 for the cutter assembly or slitter assembly shown in FIG. 11 is furnished through a belt 162 leading to an output drive pulley 163 from a gear box 164 driven by the drive shaft 34. A similar drive is provided for the other cutter assembly.

Reference to FIGS. 12 and 13 show the cam track 156 as formed by an outer plate 165 having the outer surface of cam track 156 indicated at 165a formed therein and an inner cam plate 167 having the inner cam surface of the cam track 156 formed thereon as indicated at 167a. These plates are secured to the back plate 123 which is mounted as previously described in FIGS. 11 and 14. Again referring to FIG. 11 there is attached to the inner portion of the arm member of 135 a cam 168 for moving the wadding clamp to be described. This cam 168 has the track on the outer surface thereof as indicated at 168a. The cam 168 is an annular member attached to the arm 135 by an annular spacer 169 and cap screws 170. Access to this cam track 168 is through an aperture 123b extending through the back plate 123. A cam follower 171, see FIG. 14, cooperates with the track 168a and is mounted on a pin 172 extending through aperture 123b in plate 123 and connects with an arm 173 fastened to a hub 174 pivotally mounted on a pin 175. The pin 175 is supported at one end in an aperture in plate 123 and at the other end by an apertured plate 176 supported by spacers 177 from plate 123 and secured by cap screws 178. This is also shown in FIG. 8. The plate 176 extends in a suitable aperture in main support arm portion 121a. The hub 174 has rigidly attached thereto a pair of bifurcated arms 179 and 180, see FIG. 8, with a cam follower 181 on the outer end of arm 180 which rides on the cam surface 168a of cam 168 while the other arm 179 has pivoted thereto as at 179a a control rod 181 for raising the wadding clamp as will be described.

Power for the motor 159 is provided through a connection box 159a and power leads 159b, see FIGS. 10 and 11, which lead to slip rings mounted (not shown) on slip ring housing 133, previously described. A suitable cover 133a for slip ring housing is provided as shown for its end portion in FIG. 11.

WADDING CLAMP

A wadding clamp is generally indicated at 190, see FIGS. 8 and 15, and it is under the control of the cam 168 on the slitter shaft 124 as previously described. An arm portion 121b is mounted on the arm 121 on a pivot post 182 on which is pivotally mounted a bell-crank lever generally indicated at 183 having three arm portions 183a, 183b and 183c. A rod 181 has an adjustable ball mounting generally indicated at 184 fitting in a socket 183a' on arm 183a so that the bell-crank may be rotated counterclockwise by movement of rod 181. The clamp 190 is comprised of a bottom plate 185 as shown in the bottom view, FIG. 15, and in FIG. 8 and is supported by the machine frame 30 and on a vertical frame portion 186 of the machine frame 30. The clamp 190 has a built up framework 187 with an elongated void central portion 187a having various lighting holes 187b. The frame 187 has at each end narrow end portions 188 and 189 with portion 188 terminating in a vertical tubular sleeve portion 188a and the end 189 in a vertical tubular sleeve 189a. These sleeves 188a and 189a are received on vertical pins 191 which are attached by cap screws 192 to the bottom plate and by cap screws 193 to a top plate 194. There are four corner posts 191a similar to the vertical pins 191 and similarly attached to the bottom plate 185 and the top plate 194. On the bottom of the frame 187 is mounted spaced apart pressure plates 195 and 196, see FIG. 15, as by flush screws 197. Each of these plates 195 and 196 has an inclined edge half 195a and 195b on plate 195 and 196a and 196b on plate 196. These edges are spaced apart so that at the top of the orbital paths taken by the slitters 143, they fully clear the discs of the cutters but yet provide clearance and pressure on the wadding during the cut. The clamp or frame portion 187 is held down by two springs 198 extending at their tops where they are connected to frame 187 and anchored at their bottoms to the bottom plate 185. The frame 187 is held away from the wadding and pad cut therefrom in a correct clearance position by action of the bell-crank 183 controlled by the rod 181 and cam 168. The bell-crank arm portion 183b presses up against a roller 199 pivotally mounted by a pin 200 extending up through a depending portion 187c of frame 187. Connected to the end of the bell-crank portion 183c in a pivoted manner is the reach rod 201 which connects at its other end in a pivotal manner to an arm 202 attached to a tubular member 205 pivotally mounted on a transversed shaft 203 which is mounted on a pair of spaced apart arms 204 depending from the top plate 194. Another arm 206 is integrally attached to tubular member 205 and the upper portion of its outer end presses against horizontally disposed transverse lug portion 207 on frame 187. Thereby the two arms 183b and 183c of the bell-crank 183 act together to push up the frame 187 against the tension springs 198 pulling the frame down.

PAD CONVEYOR FROM SLITTER

The continuous running conveyor 5 that takes the pads from the slitter 4 is shown in FIGS. 1 and 3. This completes the description for the invention covered by this application.

I claim as my invention:

1. Slitting apparatus for cutting pads from wadding web comprising in combination, a bed path means on which the wadding web is fed having a slot therein for passage of a rotating blade; movable clamp means for holding the wadding against the bed path during cutting; intermittent feed means for feeding the wadding along said bed path means and through the clamp means when released; slitting mechanism for cutting across said wadding with successive cuts to form pads from the wadding, said slitting mechanism having an arm means rotatably mounted about an axis, said axis lying in a plane extending generally parallel to the line of flow of wadding on the bed path means and generally parallel to the line of flow so the slitting means will make a transverse cut across said wadding, means for rotating said arm about its axis, said arm having means mounting the rotating blade thereon towards its outer end, a motor means mounted on said arm having drive means connecting it with said rotatable blade for rotating the same and counter weight means for said rotating arm; actuating means for periodically releasing said clamp means mounted on said arm means; and operating connecting means connecting said clamp means with said means for periodically releasing said clamp for feeding of wadding through the clamp means.

2. Slitting apparatus according to claim 1 wherein said operating means for the clamp is a cam mounted to rotate with said arm means and said operating connecting means is linkage having a cam follower following said cam.

3. Slitting apparatus for cutting pads from wadding web comprising, in combination, a bed path means on which the wadding web is fed having a slot therein for passage of a rotating blade; movable clamp means for holding the wadding against the bed path during cutting; intermittent feed means for feeding the wadding along said bed path means and through the clamp means when released; slitting mechanism for cutting across said wadding with successive cuts to form pads from the wadding having an arm means rotatably mounted about an axis, said axis lying in a plane extending generally parallel in the line of flow of wadding on the bed path means and generally parallel to the line of flow so that slitting means will make a transverse cut across said wadding, means for rotating said arm about its axis, an outer arm pivotally mounted on the outer portion of the rotating arm, an inner arm pivotally mounted on the rotating arm spaced in from the outer arm, a link rod pivotally connecting the outer portion of said outer and inner arms whereby said arms pivot together, said outer arm having means mounting a rotatable blade theron, motor means having means mounting it on said rotating arm, and drive means connecting said motor means and said rotatable blade; a member having a cam track therein mounted normal to said axis of said rotating arm; a cam follower for said arms and link mounted for following said cam track as said rotary arm rotates about its axis, said cam track having a contour wherein the path of the cutting portion of the rotating cutting blade is generally linear and parallel to the top of the wadding and pad during its passage through said slot during cutting; actuating means for periodically releasing said clamp means mounted on said arm means; and operating connecting means connecting said clamp means with said means for periodically releasing said clamp for feeding of wadding through the clamp means.

4. Slitting apparatus according to claim 3 wherein said axis of the rotating arm lies in its said plane at an angle to the line of flow of the wadding on the bed means equal to the taper for the sides of a tapered pad to be cut; said slot in said bed means is arranged at an angle to the flow of the wadding to receive said cutting blade, said bed means at said clamp means has an additional slot oppositely angularly disposed to said first slot, an additional slitting mechanism for cutting across said wadding like said first-mentioned slitting mechanism mounted slightly further along the line of flow of the wadding with its axis oppositely inclined to the line of flow of the wadding web and its arm mounted about 180° on its axis from the mounting of said first slitting mechanism arm.

5. Slitting means according to claim 1 including notching means positioned along said means for feeding the wrapped wadding intermittently whereby notches are cut in the sides of the wrapped wadding while stopped during its feed to provide corner cuts at the lines of slitting in said pads being successively cut from said wrapped wadding.

6. Slitting apparatus for cutting pads from wadding web comprising in combination, a bed path means on which the wadding web is fed having a slot therein for passage of a rotating blade; movable clamp means for holding the wadding against the bed path during cutting; intermittent feed means for feeding the wadding along said bed path means and through the clamp means when released; slitting means for cutting across said wadding with successive cuts to form pads from the wadding, said slitting mechanism having an arm means rotatably mounted about an axis, said axis lying in a plane extending generally parallel to the line of flow of wadding on the bed path means and generally parallel to the line of flow so the slitting means will make a transverse cut across said wadding, means for rotating said arm means about its axis, said arm having means mounting the rotating blade thereon towards its outer end, a motor means mounted on said arm having drive means connecting it with said rotatable blade for rotating the same; actuating means for periodically releasing said clamp means mounted on said arm means; and operating connecting means connecting said clamp means with said means for periodically releasing said clamp means for feeding of wadding through the clamp means.

7. Slitting means according to claim 6 wherein said intermittent feed means for feeding the wadding comprises an endless conveyor and drive means, said drive means including an overrunning clutch for driving said conveyor intermittently and pivoted arm means connected to said over-running clutch to rotate it and cause it to dwell and rotating cam means for oscillating said pivoted arm means through cam followers connected to said pivoted arm means.

References Cited

UNITED STATES PATENTS

| | | | |
|---|---|---|---|
| 1,086,671 | 2/1914 | Kaufman | 83—282 X |
| 2,090,116 | 8/1937 | Fourness et al. | 83—406 X |
| 3,203,291 | 8/1965 | Elsas | 83—255 X |

ANDREW R. JUHASZ, Primary Examiner

U.S. Cl. X.R.

83—282, 406, 483, 917